US007993542B2

(12) United States Patent
Sakurada et al.

(10) Patent No.: US 7,993,542 B2
(45) Date of Patent: Aug. 9, 2011

(54) MAGNETIC MATERIAL FOR MAGNETIC REFRIGERATION

(75) Inventors: Shinya Sakurada, Tokyo (JP); Akiko Saito, Kawasaki (JP); Tadahiko Kobayashi, Yokohama (JP); Hideyuki Tsuji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 11/689,642

(22) Filed: Mar. 22, 2007

(65) Prior Publication Data

US 2007/0241305 A1 Oct. 18, 2007

(30) Foreign Application Priority Data

Mar. 27, 2006 (JP) ............................... P2006-086421

(51) Int. Cl.

| | |
|---|---|
| ***B22F 3/00*** | (2006.01) |
| ***H01F 1/055*** | (2006.01) |
| ***H01F 1/00*** | (2006.01) |
| ***C09K 5/00*** | (2006.01) |
| ***C22C 38/00*** | (2006.01) |
| ***C22C 38/08*** | (2006.01) |

(52) U.S. Cl. ................ 252/62.55; 252/62.51 R; 252/67; 148/300; 148/301; 148/306; 148/331; 148/336; 420/83

(58) Field of Classification Search ........... 252/62.51 R, 252/62.55, 67; 148/300, 301, 306, 331, 336; 420/83
See application file for complete search history.

(56) References Cited

U.S. PATENT DOCUMENTS

| | | | | |
|---|---|---|---|---|
| 4,971,637 A * | 11/1990 | Ohashi et al. | ................. | 148/301 |
| 5,456,769 A | 10/1995 | Sakurada et al. | | |
| 5,480,495 A | 1/1996 | Sakurada et al. | | |
| 5,482,572 A * | 1/1996 | Eggert et al. | .................. | 148/101 |
| 5,482,573 A | 1/1996 | Sakurada et al. | | |
| 5,658,396 A | 8/1997 | Sakurada et al. | | |
| 5,716,462 A | 2/1998 | Sakurada et al. | | |

(Continued)

FOREIGN PATENT DOCUMENTS

JP 2002-356748 12/2002

(Continued)

OTHER PUBLICATIONS

Buschow, K.H.J., Physics and Application of Novel Magnet Materials, 1989, Journal of Magnetism and Magnetic Materials, 80, pp. 1-8.*

Sui-Geng Jin, et al., "Research for room-temperature magnetic refrigerants in $R_xCe_{2-x}Fe_{17}$ series", J. Appl. Phys. 70 (10), Nov. 15, 1991, pp. 6275-6276.

(Continued)

*Primary Examiner* — David M. Brunsman
*Assistant Examiner* — Kevin M Johnson
(74) *Attorney, Agent, or Firm* — Oblon, Spivak, McClelland, Maier & Neustadt, L.L.P.

(57) ABSTRACT

A magnetic material for magnetic refrigeration has a composition represented by $(R1_{1-y}R2_y)_xFe_{100-x}$ (R1 is at least one of element selected from Sm and Er, R2 is at least one of element selected from Ce, Pr, Nd, Tb and Dy, and x and y are numerical values satisfying 4≦x≦20 atomic % and 0.05≦y≦0.95), and includes a $Th_2Zn_{17}$ crystal phase, a $Th_2Ni_{17}$ crystal phase, or a $TbCu_7$ crystal phase as a main phase.

18 Claims, 1 Drawing Sheet

U.S. PATENT DOCUMENTS

| | | | | |
|---|---|---|---|---|
| 5,968,290 | A | 10/1999 | Sakurada et al. | |
| 6,290,782 | B1 * | 9/2001 | Sakurada et al. | 148/302 |
| 6,406,559 | B2 | 6/2002 | Sakurada et al. | |
| 6,475,302 | B2 | 11/2002 | Mei et al. | |
| 6,676,772 | B2 | 1/2004 | Saito et al. | |
| 7,063,754 | B2 | 6/2006 | Fukamichi et al. | |
| 7,076,958 | B2 | 7/2006 | Saito et al. | |

FOREIGN PATENT DOCUMENTS

| | | |
|---|---|---|
| JP | 2003-96547 | 4/2003 |
| JP | 2005-340838 | 12/2005 |

OTHER PUBLICATIONS

U.S. Appl. No. 09/144,470, filed Aug. 31, 1998, Sakurada et al.

* cited by examiner

MAGNETIC MATERIAL FOR MAGNETIC REFRIGERATION

CROSS-REFERENCE TO RELATED APPLICATIONS

This application is based upon and claims the benefit of priority from the prior Japanese Patent Application No. 2006-086421 filed on Mar. 27, 2006; the entire contents of which are incorporated herein by reference.

BACKGROUND OF THE INVENTION

1. Field of the Invention

The present invention relates to a magnetic material used for magnetic refrigeration.

2. Description of the Related Art

Most of refrigeration technologies for use in a room temperature region such as refrigerators, freezers, and air-conditioners use a gas compression cycle. But, the refrigeration technologies based on the gas compression cycle have a problem of causing environmental destruction associated with the exhaustion of specific freon gases to the environment, and there is also concern that substitute freon gases have an adverse effect upon the environment. Under the circumstances described above, clean and highly efficient refrigeration technologies, which are free from environmental problems caused by wastage of operating gases, have been demanded to be put into practical use.

Recently, magnetic refrigeration is being increasingly expected as one of such environment-friendly, highly efficient refrigeration technologies. Research and development of magnetic refrigeration technologies for use in a room temperature region is underway. The magnetic refrigeration technologies use the magnetocaloric effect of magnetic material instead of freon gases or substitute freon gases as a refrigerant to realize a refrigeration cycle. Specifically, the refrigeration cycle is realized by using a magnetic entropy change (ΔS) of the magnetic material associated with a magnetic phase transition (phase transition between a paramagnetic state and a ferromagnetic state). In order to realize the highly efficient magnetic refrigeration, it is preferable to use a magnetic material which exhibits a high magnetocaloric effect around room temperature.

As such a magnetic material, a single rare earth element such as Gd, a rare earth alloy such as Gd—Y alloy or Gd—Dy alloy, $Gd_5(Ge, Si)_4$ based material, $La(Fe, Si)_{13}$ based material, Mn—As—Sb based material and the like are known (JP-A 2002-356748 (KOKAI) and JP-A 2003-096547 (KOKAI)). The magnetic phase transition of the magnetic material is in two types including a first order type and a second order type. The $Gd_5(Ge, Si)_4$ based material, the $La(Fe, Si)_{13}$ based material and the Mn—As—Sb based material exhibit the first order magnetic phase transition. These magnetic materials can be used to easily obtain a large entropy change (ΔS) by the application of a low magnetic field but has a practical problem that its operating temperature range is narrow.

A rare earth metal such as Gd and a rare earth alloy such as Gd—Y alloy or Gd—Dy alloy exhibit the second order magnetic phase transition, so that they have advantages that they can operate in a relatively wide temperature range and also have a relatively large entropy change (ΔS). But, the rare earth element itself is expensive, and when the rare earth element or the rare earth alloy is used as a magnetic material for magnetic refrigeration, it is inevitable that the cost of the magnetic material for magnetic refrigeration becomes high.

Besides, it is also known that a $(Ce_{1-x}Y_x)_2Fe_{17}$ (x=0 to 1) based magnetic material exhibits the second order magnetic phase transition. The $(Ce, Y)_2Fe_{17}$ based magnetic material can operate in a relatively wide temperature range in the same manner as the rare earth element and the rare earth alloy, and it is a substance based on inexpensive Fe, so that the cost of the magnetic material for magnetic refrigeration can be made lower than the rare earth metal or the rare earth alloy. However, the $(Ce, Y)_2Fe_{17}$ based magnetic material has high magnetic anisotropy, so that it has a disadvantage that a magnetic entropy change amount (ΔS) associated with the magnetic phase transition is small.

SUMMARY OF THE INVENTION

A magnetic material for magnetic refrigeration according to an aspect of the present invention has a composition represented by a general formula:

$$(R1_{1-y}R2_y)_xFe_{100-x}$$

(where, R1 is at least one of element selected from Sm and Er, R2 is at least one of element selected from Ce, Pr, Nd, Tb and Dy, and x and y are numerical values satisfying $4 \leqq x \leqq 20$ atomic % and $0.05 \leqq y \leqq 0.95$), and includes a $Th_2Zn_{17}$ crystal phase, a $Th_2Ni_{17}$ crystal phase or a $TbCu_7$ crystal phase as a main phase.

A magnetic material for magnetic refrigeration according to another aspect of the present invention has a composition represented by a general formula:

$$(R1_{1-y}X_y)_xFe_{100-x}$$

(where, R is at least one of element selected from La, Ce, Pr, Nd, Sm, Gd, Tb, Dy, Ho, Er, Tm, Yb and Y, X is at least one of element selected from Ti, Zr and Hf, and x and y are numerical values satisfying $4 \leqq x \leqq 20$ atomic % and $0.01 \leqq y \leqq 0.9$), and includes a $Th_2Ni_{17}$ crystal phase or a $TbCu_7$ crystal phase as a main phase.

DETAILED DESCRIPTION OF THE INVENTION

Figure 1:
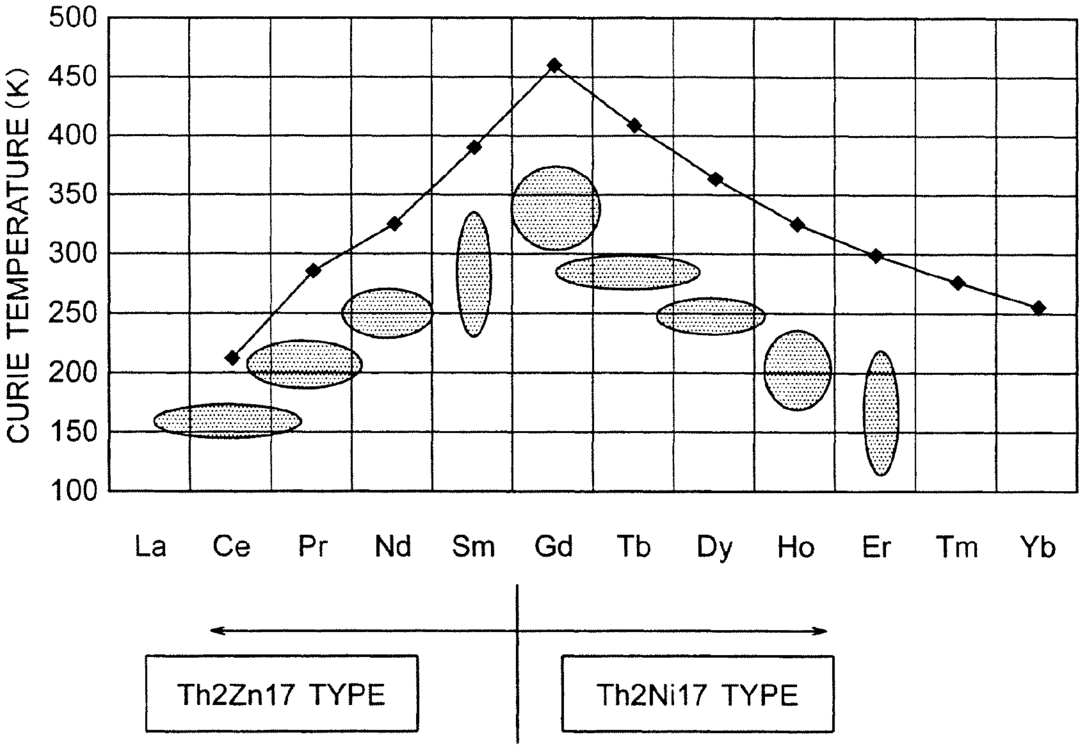
FIG. 1 is a diagram showing Curie temperatures in R—Fe based materials and 4f electron orbits of rare earth elements R.

Hereinafter, embodiments of the present invention are described. A magnetic material for magnetic refrigeration according to a first embodiment has a composition expressed by the following general formula:

$$(R1_{1-y}R2_y)_xFe_{100-x} \quad (1)$$

(where, R1 is at least one of element selected from Sm and Er, R2 is at least one of element selected from Ce, Pr, Nd, Tb and Dy, and x and y are numerical values satisfying $4 \leqq x \leqq 20$ atomic % and $0.05 \leqq y \leqq 0.95$), and includes a $Th_2Zn_{17}$ crystal phase, a $Th_2Ni_{17}$ crystal phase or a $TbCu_7$ crystal phase as a main phase.

The magnetic material for magnetic refrigeration is a material having a rare earth element (element R) and iron (Fe) as main components and inexpensive Fe as a base. Specifically, the second order magnetic phase transition is realized by a magnetic material having the rare earth element in a small amount. In order to realize the second order magnetic phase transition by such material, the magnetic material for magnetic refrigeration has a $Th_2Zn_{17}$ crystal phase (phase having a $Th_2Zn_{17}$ type crystal structure), a $Th_2Ni_{17}$ crystal phase (phase having a $Th_2Ni_{17}$ type crystal structure), or a $TbCu_7$ crystal phase (phase having a $TbCu_7$ type crystal structure) as a main phase. The main phase shall be a phase occupying a maximum volume among the constituent phases (including crystal phases and amorphous phases) of the magnetic material for magnetic refrigeration.

The magnetic material having the $Th_2Zn_{17}$ crystal phase has the element R mainly entered a position corresponding to the Th of the $Th_2Zn_{17}$ crystal phase, and the Fe mainly entered a position corresponding to the Zn of the $Th_2Zn_{17}$ crystal phase. Similarly, the magnetic material having the $Th_2Ni_{17}$ crystal phase has the element R mainly entered a position corresponding to the Th, and the Fe mainly entered a position corresponding to the Ni. The magnetic material having the $TbCu_7$ crystal phase has the element R mainly entered a position corresponding to the Tb, and the Fe mainly entered a position corresponding to the Cu.

The magnetic material of the first embodiment has the rare earth element in a small content as indicated by a site occupying atom of each crystal phase and an atom ratio between the element R and Fe based on it, so that the second order magnetic phase transition is realized by an inexpensive material. To realize the magnetic material exhibiting the second order magnetic phase transition by using the $Th_2Zn_{17}$ crystal phase, the $Th_2Ni_{17}$ crystal phase or the $TbCu_7$ crystal phase as the main phase, the value x in the formula (1) shall be in a range from 4 to 20 atomic %. When the value x is less than 4 atomic % or exceeds 20 atomic %, the magnetic material having the $Th_2Zn_{17}$ crystal phase, the $Th_2Ni_{17}$ crystal phase or the $TbCu_7$ crystal phase as the main phase cannot be realized. The value x is more preferably in a range from 8 to 15 atomic %.

The main phase of the magnetic material may be anyone of the $Th_2Zn_{17}$ crystal phase, the $Th_2Ni_{17}$ crystal phase and the $TbCu_7$ crystal phase. By using anyone of these crystal phases as the main phase, the magnetic material exhibiting the second order magnetic phase transition can be realized. But, the $TbCu_7$ crystal phase is a high-temperature phase, and a rapid solidification step or the like is required to stabilize it in a normal temperature range. Meanwhile, the $Th_2Zn_{17}$ crystal phase and the $Th_2Ni_{17}$ crystal phase are stable under normal temperature. To reduce the production cost of the magnetic material, it is preferable that the magnetic material has the $Th_2Zn_{17}$ crystal phase or the $Th_2Ni_{17}$ crystal phase as the main phase.

It depends on the kind of rare earth element R as shown in FIG. 1 whether the main phase of the magnetic material becomes the $Th_2Zn_{17}$ crystal phase or the $Th_2Ni_{17}$ crystal phase. When the rare earth element R is Ce, Pr, Nd, Sm or the like, it becomes the $Th_2Zn_{17}$ crystal phase. If the rare earth element R is Tb, Dy, Ho, Er or the like, it becomes the $Th_2Ni_{17}$ crystal phase. As described later, the element R2 is preferably at least one selected from Ce, Pr and Nd. Therefore, it is preferable that the main phase of the magnetic material is the $Th_2Zn_{17}$ crystal phase.

In a case where the magnetic material is used as a magnetic refrigeration material, a temperature (Curie temperature) indicating the magnetic phase transition (phase transition between a paramagnetic state and a ferromagnetic state) and a magnitude (ΔS) of the magnetic entropy change associated with the magnetic phase transition are significant. FIG. 1 shows a Curie temperature of the R—Fe based material to which various kinds of rare earth elements R are applied. As shown in FIG. 1, the application of Ce, Pr, Nd, Sm, Tb, Dy or Er as the element R can control the Curie temperature of the magnetic material to be close to room temperature. When the Curie temperature is close to room temperature, it means that the magnetocaloric effect can be obtained near room temperature. The Curie temperature of the magnetic material is preferably 320K or less, and more preferably 250K or more and 320K or less in view of improvement of its usefulness as the magnetic refrigeration material. The Curie temperature of the magnetic material is more preferably 270K or more.

The magnetic entropy change amount (ΔS) associated with the magnetic phase transition is affected by the magnetic anisotropy of the magnetic material. In other words, a large magnetic entropy change amount (ΔS) can be obtained by reducing the magnetic anisotropy of the magnetic material. Here, the individual figures (spherical, vertically long oval or horizontally long oval) shown in FIG. 1 indicate 4f electron orbits of the rare earth element R. For example, the 4f electron orbit of Gd is circular, indicating that the magnetic anisotropy is small. Therefore, the R—Fe based material to which Gd is applied as the R element has a large magnetic entropy change amount (ΔS). But, the Gd—Fe based material is poor in usability because the Curie temperature is excessively high.

The 4f electron orbits of Sm and Er indicate cigar like long electron orbits, and those of Ce, Pr, Nd, Tb and Dy indicate pancake-like flattened electron orbits. The R—Fe based material independently using these rare earth elements R has a large magnetic anisotropy and, therefore, a sufficient magnetic entropy change amount (ΔS) cannot be obtained. Meanwhile, where at least one of element R1 selected from Sm and Er and at least one of element R2 selected from Ce, Pr, Nd, Tb and Dy are used as a mixture, the 4f electron orbit is adjusted by a long electron or bit and a flattened electron orbit, so that the magnetic anisotropy can be lowered.

The magnetic material having the composition expressed by the formula (1) applies a mixture of element R1 and element R2 as the rare earth element to lower the magnetic anisotropy. Therefore, a magnetic material having a Curie temperature of 250K or more and 320K or less and showing a large magnetic entropy change amount (ΔS) at a relatively low magnetic field can be realized on the basis of the element R1 and the element R2. In order to obtain an increased effect of ΔS, the value y in the formula (1) is determined to fall in a range from 0.05 to 0.95. When the value y is not in this range, the mixing effect of the element R1 and the element R2 cannot be obtained satisfactorily. It is preferable that the value y is in a range from 0.25 to 0.75 in order to obtain the improvement effect of ΔS with better reproducibility.

The element R2 may be at least one selected from Ce, Pr, Nd, Tb and Dy. The use of at least one selected from Ce, Pr and Nd as the element R2 enables to increase saturation magnetization of the magnetic material. The increase in saturation magnetization of the magnetic material for magnetic refrigeration contributes to the increase of ΔS. Therefore, the element R2 preferably contains at least one selected from Ce, Pr and Nd in 70 atomic % or more of a total amount of the element R2. Besides, the element R2 is more preferably at lease one selected from Ce, Pr and Nd.

The magnetic material is not limited to the composition expressed by the formula (1) but may have a composition which has the element R or Fe partially replaced by another element. A part of the element R2 may be replaced by at least one of element R3 selected from La, Gd, Ho, Y, Tm and Yb. The partial replacement of the element R2 by the element R3 enables to control the magnetic anisotropy of the magnetic material and the Curie temperature. But, if the replacement amount by the element R3 is excessively large, the magnetic entropy change might be lowered conversely. Therefore, it is preferable that the replacement amount by the element R3 is 20 atomic % or less of the element R2.

A part of Fe may be replaced by at least one of element M1 selected from Ti, V, Cr, Mn, Co, Ni, Cu, Zn, Zr, Nb, Mo, Hf, Ta, W, Al, Si, Ga and Ge. By partially replacing Fe by the element M1, the magnetic anisotropy can be further lowered or the Curie temperature can be controlled. The element M1 is more preferably at least one selected from Ni, Co, Mn, Ti, Zr, Al and Si. But, if the replacement amount by the element M1 is excessively large, magnetization is deteriorated, and the magnetic entropy change is possibly lowered. Therefore, the replacement amount by the element M1 is preferably 20 atomic % or less of Fe.

The magnetic material for magnetic refrigeration of the first embodiment includes a composition having the rare earth element R in a small amount, exhibiting a second order magnetic phase transition, having a Curie temperature near room temperature (e.g., 320K or less), and exhibiting a large magnetic entropy change (ΔS) at a relatively low magnetic field. Therefore, a magnetic material for magnetic refrigeration having high performance and excelling in practical utility can be provided at a low cost. Such a magnetic material for magnetic refrigeration is applied to a heat regenerator, a magnetic refrigeration device and the like. At that time, it can also be used in combination with, for example, the magnetic material exhibiting a first order magnetic phase transition.

The magnetic material for magnetic refrigeration according to a second embodiment of the invention will be described. The magnetic material for magnetic refrigeration of the second embodiment has a composition expressed by the following general formula:

$$(R_{1-y}X_y)_xFe_{100-x} \quad (2)$$

(where, R is at least one of element selected from La, Ce, Pr, Nd, Sm, Gd, Tb, Dy, Ho, Er, Tm, Yb and Y, X is at least one of element selected from Ti, Zr and Hf, and x and y are numerical values satisfying $4 \leqq x \leqq 20$ atomic % and $0.01 \leqq y \leqq 0.9$), and includes a $Th_2Ni_{17}$ crystal phase or a $TbCu_7$ crystal phase as a main phase.

Similar to the first embodiment, the magnetic material for magnetic refrigeration of the second embodiment realizes a second order magnetic phase transition by a material (material having the rare earth element R in a small amount) which has rare earth element R and Fe as main components and inexpensive Fe as a base. The R—Fe based magnetic material exhibits a second order magnetic phase transition with an inexpensive composition and has a Curie temperature near room temperature (e.g., Curie temperature of 250K or more and 320K or less) based on the selection of the element R. But, there is a possibility that a sufficient magnetic entropy change amount (ΔS) cannot be obtained when only the R—Fe based composition is used.

The magnetic material for magnetic refrigeration of the second embodiment has the rare earth element R partially replaced by an element X (at least one of element selected from Ti, Zr and Hf) having an atomic radius smaller than that of the rare earth element R. Thus, by replacing the rare earth element R partially by the element X, the $Th_2Ni_{17}$ crystal phase or the $TbCu_7$ crystal phase is stabilized. Accordingly, magnetization is increased, and a large magnetic entropy change amount (ΔS) can be obtained. In other words, the magnetic material of the second embodiment is inexpensive and excels in performance and practical utility, and it is suitably used for the heat regenerator, the magnetic refrigeration device and the like. At that time, it can also be used in combination with the magnetic material exhibiting a first order magnetic phase transition.

In order to obtain a replacement effect of the element X, the value y in the formula (2) shall be in a range from 0.01 to 0.9. When the value y is less than 0.01, a stabilization effect of the $Th_2Ni_{17}$ crystal phase or the $TbCu_7$ crystal phase by the replacement by the element X cannot be obtained sufficiently. When the value y exceeds 0.9, it is hard to produce the $Th_2Ni_{17}$ crystal phase and the $TbCu_7$ crystal phase. The value y is preferably in a range from 0.01 to 0.5. The value x shall be in a range from 4 to 20 atomic % in order to produce the $Th_2Ni_{17}$ crystal phase and the $TbCu_7$ crystal phase. When it deviates from the range, it is hard to produce the $Th_2Ni_{17}$ crystal phase and the $TbCu_7$ crystal phase. The value x is more preferably in a range from 8 to 15 atomic %.

The rare earth element R of the second embodiment may be at least one selected from La, Ce, Pr, Nd, Sm, Gd, Tb, Dy, Ho, Er, Tm, Yb and Y and not limited to a special one. By using Ce, Pr, Nd, Sm or the like as the rare earth element R, the saturation magnetization of the magnetic material can be increased. Therefore, the element R preferably contains at least one selected from Ce, Pr, Nd and Sm in 50 atomic % or more of a total amount of the element R. Besides, the element R is more preferably composed of at least one selected from Ce, Pr, Nd and Sm.

The magnetic material of the second embodiment is not limited to the composition expressed by the formula (2) but may have a composition which has Fe partially replaced by another element. A part of Fe may be replaced by at least one of element M2 selected from V, Cr, Mn, Co, Ni, Cu, Zn, Nb, Mo, Ta, W, Al, Si, Ga and Ge. By replacing the Fe partially by the element M2, magnetic anisotropy, a Curie temperature and the like can be controlled. The element M2 is more preferably at least one selected from Ni, Co, Mn, Cr, V, Nb, Mo, Al, Si and Ga. But, if the replacement amount by the element M2 is too large, magnetization is decreased, and a magnetic entropy change might be decreased. Therefore, the replacement amount by the element M2 is preferably 20 atomic % or less of Fe.

The magnetic materials for magnetic refrigeration according to the first and second embodiments are produced as follows. First, an alloy containing prescribed amounts of individual elements is produced by an arc melting or an induction melting. For production of the alloy, a rapid quenching method such as a single roll method, a double roll method, a rotary disk method or a gas atomization method, and a method using solid-phase reaction such as a mechanical alloying method may be applied. The alloy can also be produced by a hot press, spark plasma sintering or the like of material metal powder without through a melting process.

The alloy produced by the above-described method can be used as a magnetic refrigeration material depending on the composition, the production process and the like. Besides, the alloy is annealed, if necessary, so to control the constituent phase (e.g., single-phasing of the alloy), to control the crystalline particle diameter and to improve the magnetic characteristic and then used as a magnetic refrigeration material. An atmosphere in which melting, rapid quenching, mechanical alloying and annealing are performed is preferably an inert atmosphere of Ar or the like in view of prevention of oxidation. The main phase crystal structure can be controlled depending on a difference in the production method and production conditions. For example, in a case where a magnetic material is produced by the rapid quenching method or the mechanical alloying method, the $TbCu_7$ crystal phase tends to be produced.

Then, specific examples of the invention and evaluated results thereof will be described.

EXAMPLES 1 TO 7

First, high-purity materials were blended at a prescribed ratio to prepare the compositions shown in Table 1, and mother alloy ingots were produced by an induction melting in an Ar atmosphere. The mother alloy ingots were thermally treated in an Ar atmosphere at 1100° C. for ten days to produce magnetic materials for magnetic refrigeration. The individual magnetic materials were examined for appeared phases by X-ray powder diffraction to find that they had a $Th_2Zn_{17}$ crystal phase or a $Th_2Ni_{17}$ crystal phase as a main phase. The main phases of the individual magnetic materials are shown in Table 1.

EXAMPLES 8 TO 11

Individual mother alloy ingots having the compositions shown in Table 1 were produced in the same way as in Examples 1 to 7, and their mother alloys were partially used to produce quenched thin ribbons. The quenched thin ribbons were produced by melting the alloys by induction melting in an Ar gas atmosphere and injecting the molten alloy onto a rotating copper roll. The roll was determined to have a peripheral velocity of 30 m/s. The obtained quenched thin ribbons (magnetic materials for magnetic refrigeration) were examined for appeared phases by X-ray powder diffraction to find that they had a $Th_2Ni_{17}$ crystal phase or a $TbCu_7$ crystal phase as a main phase. The main phases of the individual magnetic materials are shown in Table 1.

COMPARATIVE EXAMPLES 1 TO 4

Single Gd (Comparative Example 1), an $Sm_2Fe_{17}$ based material (Comparative Example 2), a $Ce_2Fe_{17}$ based material (Comparative Example 3), and an $La(Fe, Si)_{13}$ based material (Comparative Example 4) were produced in the same way as in Examples 1 to 7. The main phases of the individual materials are shown in Table 1.

TABLE 1

| | Composition | Main phase |
|---|---|---|
| Example 1 | $(Sm_{0.3}Er_{0.1}Pr_{0.5}Ce_{0.1})_{12.2}Fe_{87.8}$ | $Th_2Zn_{17}$ |
| Example 2 | $(Sm_{0.3}Pr_{0.5}La_{0.2})_{11.5}Fe_{88.5}$ | $Th_2Zn_{17}$ |
| Example 3 | $(Sm_{0.4}Er_{0.1}Nd_{0.5})_{12.0}(Fe_{0.9}Ni_{0.1})_{88.0}$ | $Th_2Zn_{17}$ |
| Example 4 | $(Sm_{0.4}Er_{0.1}Dy_{0.5})_{8.0}(Fe_{0.9}Mn_{0.1})_{92.0}$ | $Th_2Ni_{17}$ |
| Example 5 | $(Sm_{0.3}Er_{0.1}Pr_{0.5}Gd_{0.1})_{15.0}Fe_{85.0}$ | $Th_2Zn_{17}$ |
| Example 6 | $(Er_{0.4}Ce_{0.2}Nd_{0.4})_{12.5}Fe_{87.5}$ | $Th_2Zn_{17}$ |
| Example 7 | $(Sm_{0.5}Pr_{0.3}Tb_{0.2})_{12.0}Fe_{88.0}$ | $Th_2Zn_{17}$ |
| Example 8 | $(Pr_{0.4}Sm_{0.5}Dy_{0.1})_{10.2}Fe_{89.8}$ | $TbCu_7$ |
| Example 9 | $(Pr_{0.3}Sm_{0.5}Zr_{0.2})_{9.8}Fe_{90.2}$ | $Th_2Ni_{17}$ |
| Example 10 | $(Pr_{0.3}Nd_{0.2}Zr_{0.4}Hf_{0.1})_{10.2}(Fe_{0.9}Ni_{0.05}Al_{0.05})_{89.8}$ | $TbCu_7$ |
| Example 11 | $(Ce_{0.2}Pr_{0.5}Zr_{0.2}Ti_{0.1})_{10.5}Fe_{89.5}$ | $TbCu_7$ |
| Comparative Example 1 | Gd | Gd |
| Comparative Example 2 | $Sm_{11.5}Fe_{88.5}$ | $Th_2Ni_{17}$ |
| Comparative Example 3 | $Ce_{11.5}Fe_{88.5}$ | $Th_2Ni_{17}$ |
| Comparative Example 4 | $La_{6.7}(Fe_{0.88}Si_{0.12})_{86.6}H_{6.7}$ | $NaZn_{13}$ |

Then, the individual magnetic materials of Examples 1 to 11 and Comparative Examples 1 to 4 were determined for a magnetic entropy change amount $\Delta S(T, \Delta H)$ with an outer magnetic field varied from magnetization measurement data by using the following formula. In the formula, T denotes a temperature, H denotes a magnetic field, and M denotes magnetization.

$$\Delta S(T, \Delta H)=\int(\partial M(T, H)/\partial T)_H dH(H; 0\rightarrow\Delta H)$$

In any case, the $\Delta S$ indicates a peak for arbitrary $\Delta H$ at a prescribed temperature ($T_{peak}$). The $T_{peak}$ corresponds to a Curie temperature. Table 2 shows temperatures ($T_{peak}$) at which the magnetic entropy change amounts of the individual magnetic materials exhibit peaks, magnetic entropy change amounts ($\Delta S_{max}$ (absolute value)) for magnetic field changes ($\Delta H$=1.0 T) at $T_{peak}$, and the temperature widths ($\Delta T$) satisfying $\Delta S>\Delta S_{max}/2$ on the $\Delta S_{max}$–T curve.

TABLE 2

| | $T_{peak}$ (K) | $\lvert\Delta S_{max}\rvert$ (J/kg · K) | $\Delta T$ (K) |
|---|---|---|---|
| Example 1 | 315 | 2.8 | 30 |
| Example 2 | 305 | 2.4 | 28 |
| Example 3 | 300 | 2.6 | 23 |
| Example 4 | 298 | 2.2 | 30 |
| Example 5 | 318 | 2.5 | 25 |
| Example 6 | 290 | 2.4 | 28 |
| Example 7 | 310 | 2.5 | 24 |
| Example 8 | | | |
| Example 9 | 295 | 2.7 | 26 |
| Example 10 | 305 | 2.3 | 24 |
| Example 11 | 310 | 2.5 | 29 |
| Comparative Example 1 | 295 | 3.2 | 28 |
| Comparative Example 2 | 375 | 1.7 | 25 |
| Comparative Example 3 | 215 | 1.5 | 23 |
| Comparative Example 4 | 277 | 16 | 7 |

It is apparent from Table 2 that the individual magnetic materials of Examples 1 to 11 show $\Delta S_{max}$ and $\Delta T$ equivalent to those of Gd of Comparative Example 1 though a rare earth element is contained in a small amount. It contributes greatly to provision of the magnetic material exhibiting a second order magnetic phase transition at a low cost. Meanwhile, it is seen that Comparative Example 2 is poor in performance because it has small $\Delta S_{max}$ though the $\Delta T$ shows a good value. Comparative Example 3 is poor in $T_{peak}$, $\Delta T$ and $\Delta S_{max}$. It is seen that the $La(Fe, Si)_{13}$ based material of Comparative Example 4 has a rare earth element in a small amount and shows large $\Delta S_{max}$ but has a small value $\Delta T$ and drawbacks in a practical view because it uses a first order magnetic phase transition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic material consisting of a composition represented by the formula:

$$(R1_{1-y}R2_y)_x(Fe)_{100-x}$$

wherein:

R1 is at least one element selected from Sm and Er,

R2 is at least one element selected from Ce, Pr, Nd, Tb and Dy, x is a value satisfying $4\leqq x\leqq 20$ atomic %, and y is a value satisfying $0.05\leqq y\leqq 0.95$, wherein optionally a part of Fe is substituted by at least one element selected from Mn and Ni and wherein optionally a part of R2 is substituted by at least one element selected from La, Gd, Ho, Y, Tm and Yb, and wherein the crystal phase of the magnetic material consists essentially of a crystal phase with a structure analogous to at least one selected from a $Th_2Zn_{17}$ crystal structure, a $Th_2Ni_{17}$ crystal structure and a $TbCu_7$ crystal structure and has a Curie temperature of 320K or less.

2. The material according to claim 1, wherein the magnetic material exhibits a second order magnetic phase transition.

3. The material according to claim 1, wherein element R2 contains 70 atomic % or more of at least one selected from Ce, Pr and Nd.

4. The material according to claim 1, wherein element R2 is at least one selected from Ce, Pr and Nd.

5. The material according to claim 1, wherein a part of R2 is substituted by at least one element selected from La, Gd, Ho, Y, Tm and Yb.

6. The material according to claim 5, wherein up to 20 at. % of R2 is substituted by at least one element selected from La, Gd, Ho, Y, Tm and Yb.

7. The material according to claim 1, wherein a part of Fe is substituted by Mn.

8. The material according to claim 1, wherein the crystal phase of the magnetic material consists essentially of a $Th_2Zn_{17}$ crystal structure.

9. The material according to claim 1, wherein the crystal phase of the magnetic material consists essentially of a $Th_2Zn_{17}$ crystal structure.

10. The material according to claim 1, wherein the crystal phase of the magnetic material consists essentially of a $TbCu_7$ crystal structure.

11. The material according to claim 1, wherein R1 consists of Sm and Er.

12. The material according to claim 1, wherein the magnetic material has a Curie temperature of 250 K-320 K.

13. The material according to claim 1, wherein the magnetic material has a Curie temperature of 270 K-320 K.

14. The material according to claim 1, wherein a part of Fe is substituted by Ni.

15. The material according to claim 14, wherein up to 20 at. % of Fe is substituted by Ni.

16. The material according to claim 1, wherein said part of Fe is not substituted by Mn or Ni.

17. The material according to claim 1, wherein said part of R2 is not substituted by at least one element selected from La, Gd, Ho, Y, Tm and Yb.

18. The material according to claim 1, wherein said part of Fe is not substituted by Mn or Ni and wherein said part of R2 is not substituted by at least one element selected from La, Gd, Ho, Y, Tm and Yb.

* * * * *